United States Patent
Kremp et al.

(10) Patent No.: US 10,915,649 B2
(45) Date of Patent: Feb. 9, 2021

(54) ASSOCIATION-BASED ACCESS CONTROL DELEGATION

(71) Applicant: SAP SE, Walldorf (DE)

(72) Inventors: Juergen Kremp, Walldorf (DE); Ralf Miko, Wallduern (DE); Andreas Riehl, Wiesloch (DE); Michael Belenki, Karlsruhe (DE)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 16/126,104

(22) Filed: Sep. 10, 2018

(65) Prior Publication Data
US 2020/0082107 A1    Mar. 12, 2020

(51) Int. Cl.
*G06F 16/245* (2019.01)
*G06F 21/62* (2013.01)

(52) U.S. Cl.
CPC ........ *G06F 21/6218* (2013.01); *G06F 16/245* (2019.01)

(58) Field of Classification Search
CPC ........................... G06F 16/245; G06F 21/6218
USPC .......................... 707/999.103, 999.009, 805
See application file for complete search history.

(56) References Cited

U.S. PATENT DOCUMENTS

| | | | |
|---|---|---|---|
| 4,894,771 A | 1/1990 | Kunil et al. | |
| 5,956,404 A | 9/1999 | Schneier | |
| 5,978,475 A | 11/1999 | Schneier | |
| 6,208,993 B1 | 3/2001 | Shadmon | |
| 6,367,013 B1 | 4/2002 | Bisbee et al. | |
| 6,868,406 B1 | 3/2005 | Ogg | |
| 6,951,013 B1 | 9/2005 | Lozins et al. | |
| 6,968,456 B1 | 11/2005 | Tripathi et al. | |
| 7,536,673 B2 | 5/2009 | Brendle et al. | |
| 7,565,684 B2 | 7/2009 | Fiedler et al. | |
| 7,644,088 B2 | 1/2010 | Fawcett et al. | |
| 7,668,860 B2 | 2/2010 | Naibo et al. | |
| 7,685,194 B2 | 3/2010 | Kabra et al. | |
| 7,716,213 B2 | 5/2010 | Ctner et al. | |
| 7,894,602 B2 | 2/2011 | Mueller et al. | |
| 7,937,401 B2 | 5/2011 | Pasumansky et al. | |
| 8,010,521 B2 | 8/2011 | Kissner et al. | |

(Continued)

OTHER PUBLICATIONS

Extended European Search Report issued in European Application No. 18208023.4 dated Apr. 3, 2019, 7 pages.

*Primary Examiner* — Robert W Beausoliel, Jr.
*Assistant Examiner* — Pedro J Santos
(74) *Attorney, Agent, or Firm* — Fish & Richardson P.C.

(57) ABSTRACT

The present disclosure involves systems, software, and computer implemented methods for access control delegation. One example method includes identifying creation of a derived entity from an originating entity. A definition of the derived entity is modified to include an association to the originating entity. A derived access control definition is created based on an originating access control definition. Access control condition(s) in the derived access control definition are identified. Modified access control condition (s) are created by modifying column reference(s) to include a reference to the association to the originating entity. A query is received for the derived entity. A modified query is created by including, in the received query, the modified access control condition(s) and unfolding the association to the originating entity. The modified query is executed, including evaluation of the modified access control condition(s) to determine records of the derived entity that are accessible to a query user.

17 Claims, 6 Drawing Sheets

(56) References Cited

U.S. PATENT DOCUMENTS

| | | |
|---|---|---|
| 8,230,228 B2 | 7/2012 | Hahn et al. |
| 8,316,240 B2 | 11/2012 | Graziani |
| 8,381,285 B2 | 2/2013 | Dau et al. |
| 8,572,124 B2 | 10/2013 | Behal et al. |
| 8,792,638 B2 | 7/2014 | Kremp |
| 8,990,146 B2 | 3/2015 | Nos et al. |
| 9,355,159 B2 | 5/2016 | Sage et al. |
| 9,672,347 B2 | 6/2017 | Bauer et al. |
| 2002/0095405 A1 | 7/2002 | Fujiwara |
| 2004/0220896 A1 | 11/2004 | Finlay et al. |
| 2004/0267668 A1 | 12/2004 | Aissi |
| 2005/0234909 A1 | 10/2005 | Bade |
| 2006/0137019 A1 | 6/2006 | Dettinger et al. |
| 2007/0043948 A1 | 2/2007 | Bugbee et al. |
| 2008/0104407 A1 | 5/2008 | Horne |
| 2009/0016534 A1 | 1/2009 | Ortiz Cornet et al. |
| 2009/0199301 A1 | 8/2009 | Chandrasekaran et al. |
| 2009/0228701 A1 | 9/2009 | Lin et al. |
| 2009/0319405 A1 | 12/2009 | Kawai et al. |
| 2010/0115284 A1 | 5/2010 | Hahn et al. |
| 2010/0262444 A1 | 10/2010 | Atwal et al. |
| 2011/0041180 A1 | 2/2011 | Jakobsson et al. |
| 2011/0314297 A1 | 12/2011 | Jakobsson et al. |
| 2012/0239935 A1 | 9/2012 | Osborne et al. |
| 2013/0031565 A1 | 1/2013 | Wachter et al. |
| 2013/0066893 A1 | 3/2013 | Humprecht |
| 2013/0238659 A1 | 9/2013 | Roitman et al. |
| 2013/0276066 A1 | 10/2013 | Buehl |
| 2015/0142852 A1 | 5/2015 | Lippert et al. |
| 2015/0188715 A1 | 7/2015 | Castellucci et al. |
| 2016/0328575 A1 | 11/2016 | Miao et al. |
| 2017/0371942 A1 | 12/2017 | Baumgaertel et al. |

ASSOCIATION-BASED ACCESS CONTROL DELEGATION

TECHNICAL FIELD

The present disclosure relates to computer-implemented methods, software, and systems for association-based access control delegation.

BACKGROUND

A database view can provide a higher-level abstraction of data in a database as compared to physical artifacts, such as database tables, that are stored in the database. A view can be created that selects a subset of fields from one or more database tables. Views can be stacked—e.g., a view can be created based on another view. A view can be created for a specific purpose, such as to provide data that is to be presented in a particular user interface.

SUMMARY

The present disclosure involves systems, software, and computer implemented methods for association-based access control delegation. One example method includes identifying, in a database system, creation of a derived data entity from an originating data entity. The originating data entity is associated with an originating access control definition. A data definition of the derived data entity is automatically modified to include an association to the originating entity. A derived access control definition is created based on the originating access control definition. At least one access control condition is identified in the derived access control definition. An access control condition can include at least one column reference. At least one modified access control condition is automatically created by modifying each column reference to include a reference to the association to the originating data entity. A query for the derived data entity is received. The query is associated with a particular user. A modified query is automatically created by including, in the received query, the at least one modified access control condition and unfolding, in the received query, the association to the originating data entity. The modified query is executed, including the evaluation of the at least one modified access control condition to determine records of the derived data entity that are accessible to the particular user. The evaluating includes accessing data of the originating data entity.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Retrieval of data from a database may be access controlled with respect to a user accessing a generated result set. Situations may occur in a database system in which entities (e.g., tables, views) are based on each other in a way which makes implicit re-use of the access control of an underlying entity desirable. For example, a projection view can be created on an existing entity to reduce the number of selected columns by column masking or reduction of rows by additional selection predicates. Such operations may not require new access control schemes.

A typical procedure may be to copy the access control of an originating entity to a derived entity that is based on the originating entity. However, such copying can result in an increase to a total cost of development and maintenance due to manual replication of access control logic. Additionally, some changes to a derived entity may be unallowable or may cause problems, such as changes that affect columns that are part of access control conditions in the originating entity.

An access control delegation approach can be used to achieve a lower total cost of development and maintenance, while preserving flexibility for defining and modifying derived entities. The access control delegation approach involves the automatic creation of an implicit backreference to an originating entity when a derived entity is created. Using the backreference, all fields of the originating entity are reachable from the derived entity. Accordingly, access control definitions for derived entities can be modified so that field (e.g., column) references are automatically modified to use the automatically-created backreference. Access control relevant columns can be resolved, when the access control definition is applied at runtime, using the backreference, rather than a column name of the derived entity itself.

This access control delegation approach gives a designer of the derived entity flexibility to remove or rename columns from the originating entity, including fields that were used for access control in the originating entity, thus providing a decoupling of the originating entity and the derived entity, which can result in decreased maintenance costs. By the same reason, the designer of the access control of the originating entity can have the flexibility to use any of the fields present in the originating entity for access control purposes. The flexibility provided by the access control delegation approach is not present with an approach of simple duplication of access control of the originating entity to the derived entity, since, as described below, one or more of application errors, inconsistencies, or increased maintenance and synchronization costs may occur.

Figure 1:
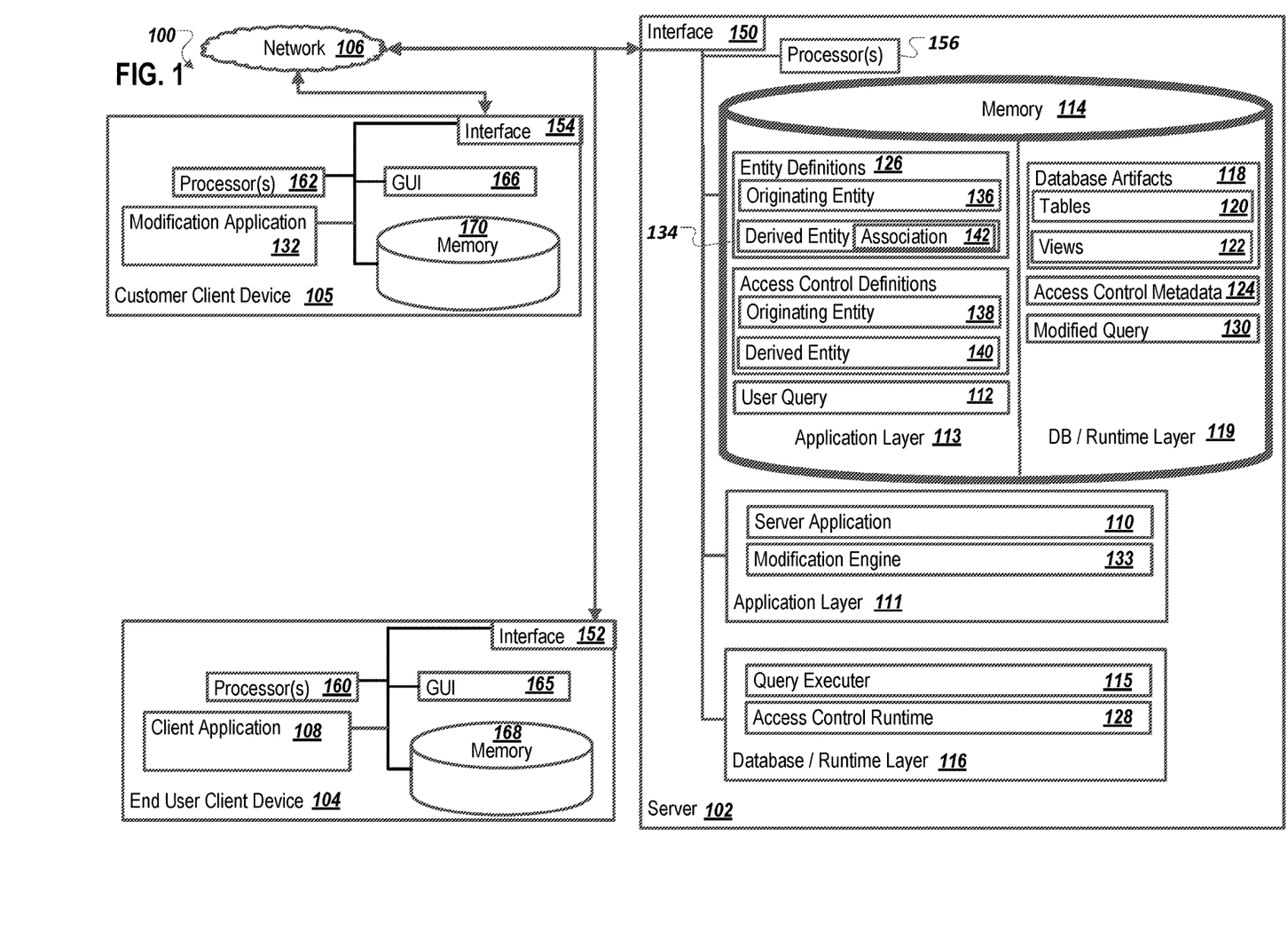
FIG. 1 is a block diagram illustrating an example system for association-based access control delegation.

FIG. 1 is a block diagram illustrating an example system 100 for association-based access control delegation. Specifically, the illustrated system 100 includes or is communicably coupled with a server 102, an end-user client device 104, a customer client device 105, and a network 106. Although shown separately, in some implementations, functionality of two or more systems or servers may be provided by a single system or server. In some implementations, the functionality of one illustrated system or server may be provided by multiple systems or servers.

An end user can use the end-user client device 104 to use a client application 108, which can be a client version of a server application 110 included in an application layer 111 of the server 102. The client application 108 can submit a user query (stored temporarily as a user query 112 in an application layer 113 of memory 114) to the server 102. The server application 110 can submit the user query 112 to a query executer 115 in a database/runtime layer 116, to execute the user query 112.

The user query 112 can query one or more database artifacts 118 (stored in a database/runtime layer 119 in memory 114), such as one or more database tables 120 or database views 122. Some or all of the database artifacts 118 accessed by the user query 112 can have access control defined. Access control can be configured so that certain records of certain database artifacts 118 are returned for certain users. For example, a query for a user at a given site can have records returned, automatically, through access control, that are specific to the given site, even if the query is not directly filtering by site. Access control metadata 124 can be stored which represents access control conditions that have been defined for certain data artifacts 118 (or for certain higher-level entity definitions 126, as described below). An access control runtime 128 can apply the access control metadata 124 to the user query 112 to create a modified query 130. The query executer 115 can ultimately execute the modified query 130, with results being returned to the client application 108.

In some implementations, client applications such as the client application 108 access higher level virtual entities (e.g., database views) that are stored virtually in the application layer 113. Virtual entities can be defined using entity definitions 126 (e.g., view definitions). Physical database artifacts 118 can correspond to the virtual entities. The query executer 115 can, at runtime, transform a user query 112 that refers to virtual entities to a modified query 130 that refers to corresponding database artifacts 118.

Some default virtual entities can be provided by a software provider when a system is deployed. The software provider can provide a modification application 132 (with a corresponding server-side modification engine 133) to customers (e.g., administrators) to enable customers to create custom virtual entities. For example, a customer can use the modification application 132 to create a derived entity 134 that is based on an originating (e.g., existing) entity 136. The originating entity 136 can have a corresponding access control definition 138. When the derived entity 134 is created, access control from the originating entity 136 can be preserved, as described above.

Although a derived access control definition 140 can be created by copying the originating access control definition 138, a more refined access-control delegation approach can be used, to provide flexibility for defining derived entities, to lessen access control maintenance costs, and to ensure proper access control preservation. For example, the modification engine 133 can recognize that the derived entity 134 has been created from the originating entity 136 and that the originating entity 136 has the associated originating access control definition 138. The modification engine 133 can automatically modify a data definition of the derived entity 134 to include an association 142 to the originating entity 136.

The modification engine 133 can automatically create the derived access control definition 140 based on the originating access control definition 138 The modification engine 133 can identify each of the access control conditions in the derived access control definition 140 (e.g., access control conditions can include at least one column reference to a column returned by the derived entity 134). The modification engine 133 can automatically create at least one modified access control condition, in the derived access control definition 140, by modifying each column reference to include a reference to the association 142 to the originating entity 136. Access control metadata 124 can be created and stored, for the derived entity 134, based on the modified access control condition(s).

When a user query 112 for the derived entity 134 is received, the access control runtime 128 can automatically create a modified query 130 by inserting the modified access control condition(s) into the user query 112. The query executer 115 can create a further modified query 130 by unfolding (e.g., to a join statement) the association 142 to the originating entity 136. The query executer 115 can further modify the modified query 130 to create a final query by resolving references to virtual entities to corresponding database artifacts 118. The query executer 115 can execute the final query, which can include evaluating the modified access control condition(s) to determine records of the derived entity 134 that are accessible to the user associated with the user query. Evaluating the modified access control condition(s) can include accessing data of the originating entity 136 through the unfolded association 142, rather than accessing data of the derived entity 140. Further details of the access-control delegation approach are described below.

As used in the present disclosure, the term "computer" is intended to encompass any suitable processing device. For example, although FIG. 1 illustrates a single server 102, a single end-user client device 104, and a single customer client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154 are used by the server 102, the end-user client device 104, and the customer client device 105, respectively, for communicating with other systems in a distributed environment—including within the system 100—connected to the network 106. Generally, the interfaces 150, 152, and 154 each comprise logic encoded in software and/or hardware in a suitable combination and operable to communicate with the network 106. More specifically, the interfaces 150, 152, and 154 may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 114. In some implementations, the server 102 includes multiple memories. The memory 114 may include any type of memory or database module and may take the form of volatile and/or non-volatile memory including, without limitation, magnetic media, optical media, random access memory (RAM), read-only memory (ROM), removable media, or any other suitable local or remote memory component. The memory 114 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the customer client device 105 may each generally be any computing device operable to connect to or communicate with the server 102 via the network 106 using a wireline or wireless connection. In general, the end-user client device 104 and the customer client device 105 each comprise an electronic computer device operable to receive, transmit, process, and store any appropriate data associated with the system 100 of FIG. 1. The end-user client device 104 and the customer client device 105 can each include one or more client applications, including the client application 108 or the modification application 132, respectively. A client application is any type of application that allows the end-user client device 104 or the customer client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the customer client device 105 respectively include processor(s) 160 or processor(s) 162. Each processor 160 or 162 included in the end-user client device 104 or the customer client device 105 may be a central processing unit (CPU), an application specific integrated circuit (ASIC), a field-programmable gate array (FPGA), or another suitable component. Generally, each processor 160 or 162 included in the end-user client device 104 or the customer client device 105 executes instructions and manipulates data to perform the operations of the end-user client device 104 or the customer client device 105, respectively. Specifically, each processor 160 or 162 included in the end-user client device 104 or the customer client device 105 executes the functionality required to send requests to the server 102 and to receive and process responses from the server 102.

The end-user client device 104 and the customer client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the customer client device 105 may comprise a computer that includes an input device, such as a keypad, touch screen, or other device that can accept user information, and an output device that conveys information associated with the operation of the server 102, or the respective client device itself, including digital data, visual information, or a GUI 165 or a GUI 166, respectively.

The GUIs 112 and 166 interface with at least a portion of the system 100 for any suitable purpose, including generating a visual representation of the client application 108 or the configuration application 136, respectively. In particular, the GUI 112 and/or the GUI 166 may be used to view and navigate various Web pages. Generally, the GUI 112 and the GUI 166 provide a respective user with an efficient and user-friendly presentation of business data provided by or communicated within the system. The GUI 112 and the GUI 166 may each comprise a plurality of customizable frames or views having interactive fields, pull-down lists, and buttons operated by the user. The GUI 112 and the GUI 166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the customer client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or customer client devices 105 associated with, or external to, the system 100. For example, while the illustrated system 100 includes one end-user client device 104, alternative implementations of the system 100 may include multiple end-user client devices 104 communicably coupled to the server 102 and/or the network 106, or any other number suitable to the purposes of the system 100. Additionally, there may also be one or more additional end-user client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the end-user client device 104 and the customer client device 105 may be described in terms of being used by a single user, this disclosure contemplates that many users may use one computer, or that one user may use multiple computers.

Figure 2:
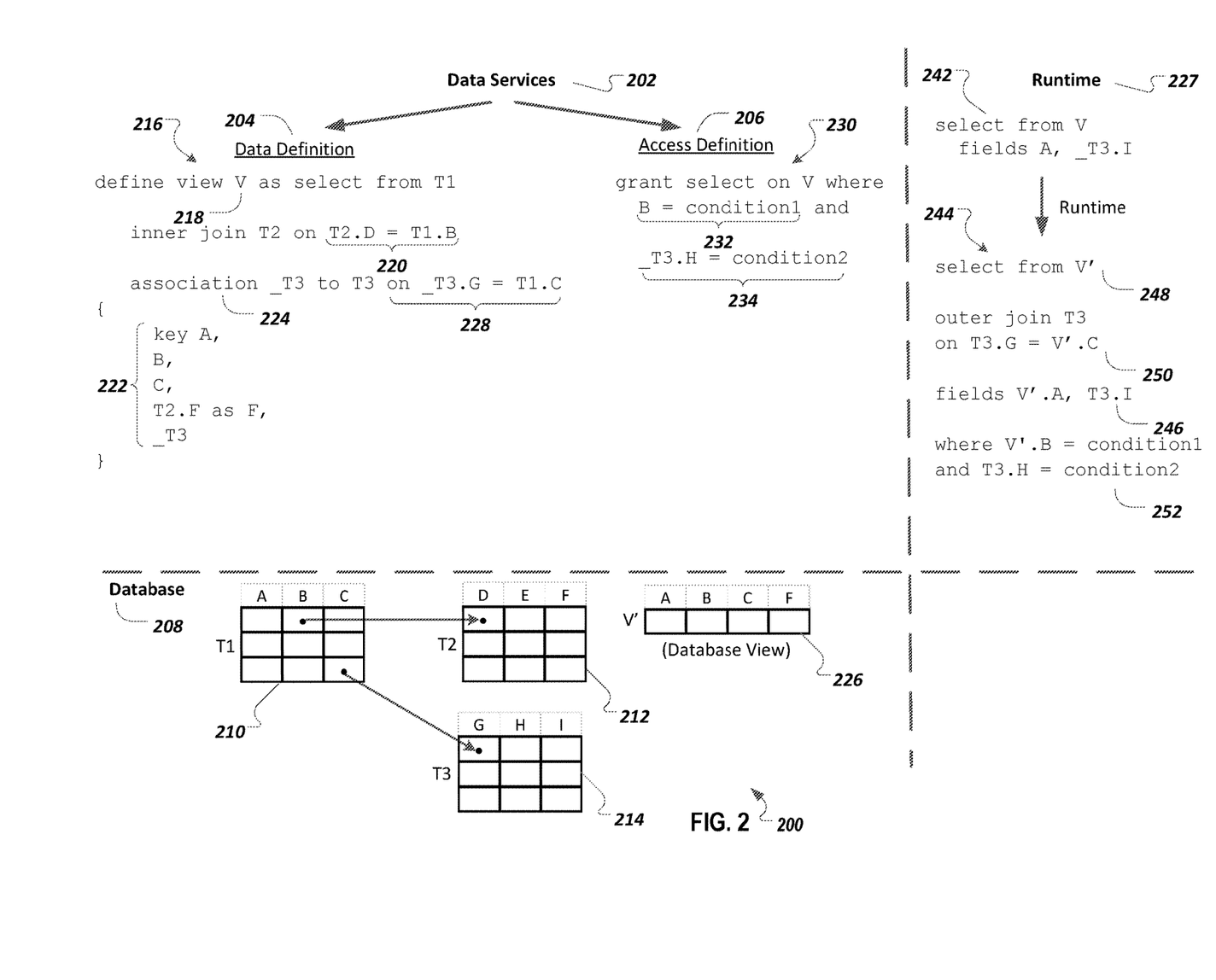
FIG. 2 illustrates an example system for data access control.

FIG. 2 illustrates an example of a system 200 for data access control. A data services component 202 includes a data definition layer 204 and an access definition layer 206 for providing services relating to data stored in a database 208. The data definition layer 204 enables definition of data selection objects which may be higher level objects than lower-level database tables (e.g., T1, T2, T3 tables 210, 212, and 214, respectively) that are stored in the database 208. Data selection objects can be defined using a Data Definition Language (DDL). The access definition layer 206 provides declarative methods for defining access control for defined objects.

A view definition 216 has been defined in the data definition layer 204. The view definition 216 defines a virtual view V 218 that selects data from the T1 210 and T2 212 tables, and joins the T1 210 and T2 212 selected data together using an inner join (e.g., using a join condition 220). A field list 222 specifies that the virtual view V 218 is to include fields A, B, and C (from the T1 table 210) and a field F (from the T2 table 212).

A developer may have defined the virtual view V 218 due to an application program only needing the A, B, C, and F fields, and not other fields, from the T1 210 and T2 212 tables. As another example, a systems provider may have provided the virtual view V in a product release. The virtual view V may include sales order and related information, for example. The virtual view V 218 can provide a simplified interface for the application program as compared to the application program querying the underlying tables directly. The view definition 216 also includes an association 224 that enables an application program that uses the virtual view V 218 to navigate to the T3 table 214 using the virtual view V 218. The application program does not need to know that there are two tables and an association included in the virtual view V 218. The application program can simply know that it can query the virtual view V 218 and access the fields in the field list 222 and/or fields of the T3 table 214 (using the association 224).

Once the virtual view V 218 has been defined, the view definition 216 can be stored (e.g., in the data services component 202, e.g., as a text file). After the virtual view V 218 has been defined, a physical view artifact 226 can be stored in the database 208 that includes the A, B, C, and F fields listed in the field list 222. As described below, a runtime component 227 can retrieve data from the physical view artifact 226 when the virtual view V 218 is queried by an application program. In some implementations, the association 224 does not result in the generation of an artifact in the database 208. The association 224 can be treated as a virtual join template that is unfolded to an outer join (e.g., using a join condition 228) at run time.

An access control definition 230 has been defined in the access control layer 204, to specify access conditions for the virtual view V 218. The access control definition 230 results in the allowing of access to data in the virtual view V 218 if both a first access control condition 232 and a second access control definition 234 are fulfilled. The first access control condition 232 specifies a match of the field B to a "condition1" condition. The second access control condition 234 specifies a match of the field H from the association 224 to a "condition2" condition.

The condition1 and condition2 conditions can be data that is derived from a currently logged-in user. The access control definition 230 can be defined so that when different users run the same application, different result sets may be generated, due to different users having access to different sets of information. For example, a first user may be associated with a "plant 1" site and a second user may be associated with a "plant 2" site. The first access control condition 232 may be defined to limit access to data that is associated with the plant number associated with the current user. The access control definition 230 can be stored as metadata by the data services component 202, for use by the runtime component 227.

The runtime component 227 can transform a received query 242 into an executable query 244. For example, the received query 242 requests the field A, and the field I (e.g., via the association 224), from the virtual view V 218. The executable query 244 includes a same fields list 246 as is included in the received query 242. As indicated by an artifact name 248, the executable query 244 now selects data from the physical view artifact 226 associated with the virtual view 218, rather than the virtual view V 218. The runtime component 240 has added an outer join 250 to the executable query, to unfold the association 224 to the association target (e.g., the T3 table 214).

An access control execution layer of the runtime component 240 can apply the access control definition 230 to the received query 242. The access control definition 230 can be automatically applied, without request of or knowledge by the application program that submitted the received query 242. The access control definition 230 can be written in a database-agnostic language. The access control execution layer can, when applying the access control definition 230 to the received query 242, translate the access control definition 230 into instructions that are specific to the database 208 on which the executable query is to be executed.

The access control definition 230 is applied to the received query 242 by including, in a where clause 252, conditions corresponding to the first access control condition 232 and the second access control condition 234. A reference to the virtual view V 218 has been replaced, in the where clause 252, with a reference to the physical view artifact 226 (e.g., V'). A reference to the association 224 (e.g., _T3) has been replaced, in the where clause 252, with the association target T3. The where clause 252, when executed, retrieves only rows that apply to the current user.

Figure 3:
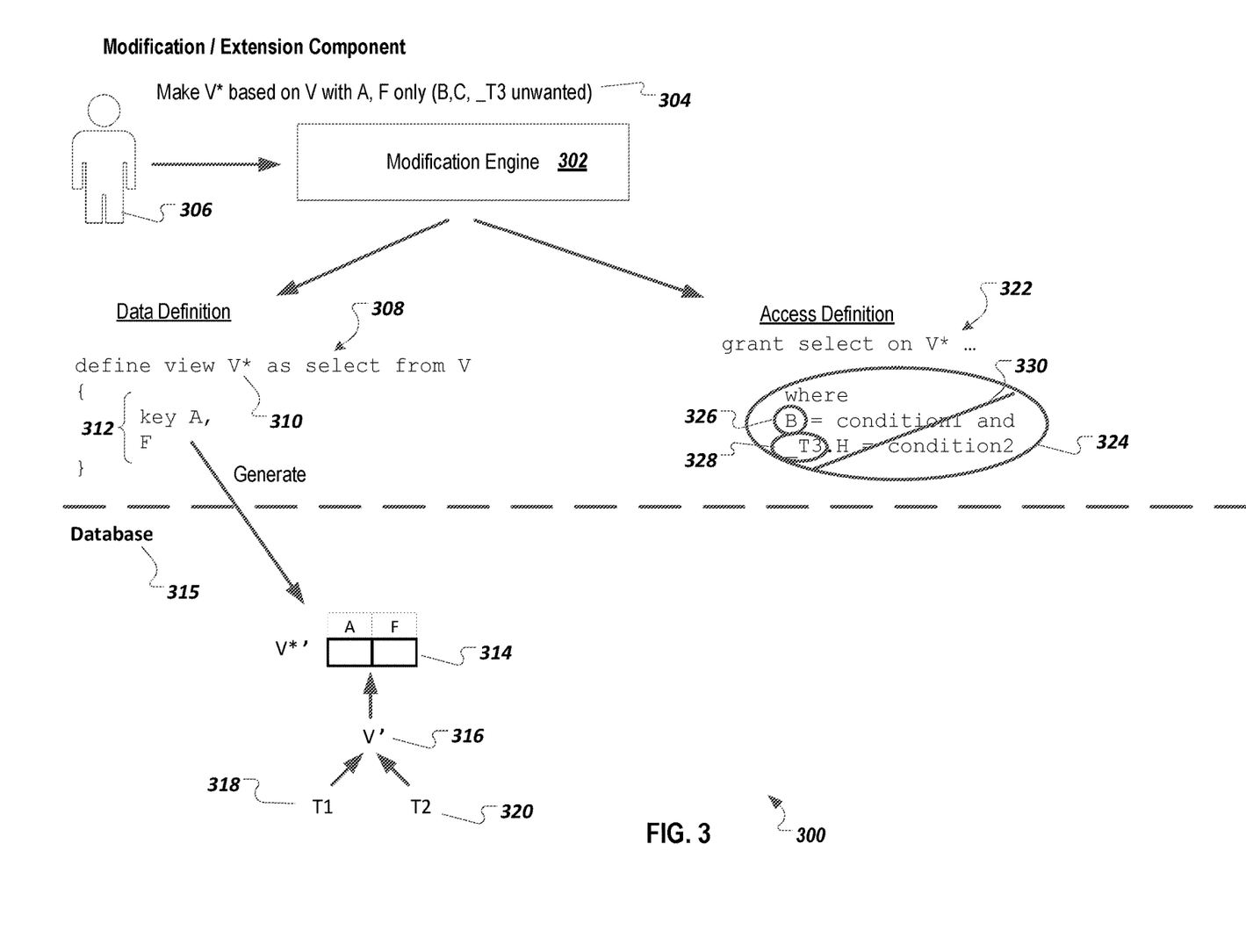
FIG. 3 illustrates an example system for creating a derived entity based on an existing entity.

FIG. 3 illustrates an example system 300 for creating a derived entity based on an existing entity. A modification engine 302 enables customers (e.g., developers, administrators) of an application system to create derived entities based on existing entities. A derived entity can utilize an existing entity (which may be referred to as an originating entity) as a data selection foundation. For example, certain fields of an existing view may not be needed for a certain business or application context, and a customer may wish to create a derived view that only includes desired fields or associations. As another example, a customer may wish to rename, in a derived view, one or more fields to match nomenclature used in the customer's business context (e.g., a customer may want to change a field named "plant" to have a name of "site". A derived view that only includes desired fields can be referred to as a projection view. As another example, a customer may apply a calculation function to one or more fields to convert the data to another representation (e.g. a customer may want to change a location code field from ISO (International Organization for Standardization) format to UN/LOCODE (United Nations Code for Trade and Transport Locations)).

As a particular example, an existing view may be a sales order view provided by an application system. A customer may wish to create a sales-order based user interface that only uses some of the sales order information provided by the existing sales order view. The customer can create a derived view, based on the existing view, that includes desired sales-order fields and excludes unwanted sales-order fields.

In the example of FIG. 3, and as illustrated by a note 304, a customer 306 wishes to create a derived view based on the existing virtual view V 218 (of FIG. 2) so that the derived view includes only the fields A and F (e.g., the customer 306 does not want the fields B, C, and the association _T3 in the derived view). The customer 306 can, e.g., using the modification engine 302, create a derived view definition 308 that defines a virtual view V* 310 that selects data from the virtual view V 218 (e.g., selecting fields A and F as indicated in a field list 312).

After the virtual view V* 310 has been defined, a physical view artifact V*' 314 representing the virtual view V* 310 can be created in a database 315. The physical view artifact 314 includes the fields A and F. The physical view artifact 314 is configured to retrieve the fields A and F from the physical view artifact V' 226 (e.g., of FIG. 2, as illustrated by a V' artifact name 316), with the physical view artifact V' 226 retrieving field A data from the T1 table 210 (e.g., as illustrated by a T1 table name 318) and field F data from the T2 table 212 (e.g., as illustrated by a T2 table name 320).

When a derived entity is created based on an originating entity, security access that has been defined for the originating entity should be preserved in the derived entity. A query submitted against a derived entity should not show more or less records than a corresponding query submitted against the originating entity. For instance, an application program executing a query against the derived virtual view V* 310, should not see records that would be restricted by access control defined for the virtual view V 218. Returning different records from queries submitted against a derived entity versus queries submitted against an originating entity can be unexpected, erroneous, and can potentially cause other problems, including legal problems.

One approach for defining access control in a derived entity is to copy access control condition(s) from the access control definition for the originating entity to the derived entity. For example, an access control definition 322 can be defined, in part, for the virtual view V* 310, by inserting the first access control condition 232 and the second access control definition 234 from the access control definition 230 into the access control definition 322, as illustrated by a where clause 324.

However, the where clause 324 is not syntactically correct, because a field B reference 326 and an association T3 reference 328 refer to items that are not in the virtual view V* 310 (e.g., the field B and the association _T3 were not selected from the virtual view V 218 when the virtual view V* was defined). Accordingly, the where clause 324 is not executable (e.g., as illustrated by a line cross out 330).

Thus, automatic generation of access control for a derived entity by simple copying of access control conditions from the originating entity may not be a viable approach in certain situations, such as where the derived entity has removed fields on which the access control conditions are based. Even if a derived entity does not remove fields on which access control is based in the originating entity, problems can occur in later stages of an application lifetime. For example, a systems provider may need to deploy a change to access control in the originating entity, to include a field that is not selected in the derived entity. Access control for the derived entity may then not be correct, if it was originally copied from the originating entity, and may also need to be updated. However, if updated access control conditions are simply copied to the derived entity, a same problem emerges as described above—e.g., the access control for the derived entity may refer to fields that are not included in the derived entity.

For one potential solution of preserving access control in derived entities, the modification engine 302 can prevent, when creating a derived entity, removal or modification (e.g., renaming, conversion) of fields from an originating entity that are used in access control of the originating entity. For example, if an application developer attempted to create a derived view based on an existing view by removing one or more fields from the existing view that were used for access control in the existing view, the modification engine 302 can generate an error, indicating that certain fields can't be removed because those fields are needed for internal purposes of access control.

However, this potential solution can also result in problems during the lifecycle of the system. For example, suppose an application developer creates, at a first point in time, a derived view that removes a particular field from an existing view, with that field not used, at that first point in time, for access control for the existing view. The derived view can inherit the access control for the originating view. A systems provider may, at a second point in time that is later than the first point in time, want to deliver a fix to access control for the originating view, with the fix now using the particular field. If the fix is deployed to a system in which the derived view is deployed, a situation arises in which the derived view, and the access control for the derived view, do not include the particular field. The access control for the derived view would then be inconsistent with the access control for the originating view, but if the access control conditions are copied from the originating view to the derived view, a same problem again emerges as described above—e.g., the access control for the derived view may refer to fields that are not included in the derived view.

As another example of a potential solution, the modification engine can freeze access control for an entity once the access control is defined and deployed to customers. However, this potential solution does not enable the delivery of security fixes that adjust access control. Accordingly, this potential solution may not be acceptable. As described below, an acceptable solution can involve access control delegation using an automatically inserted association.

Figure 4:
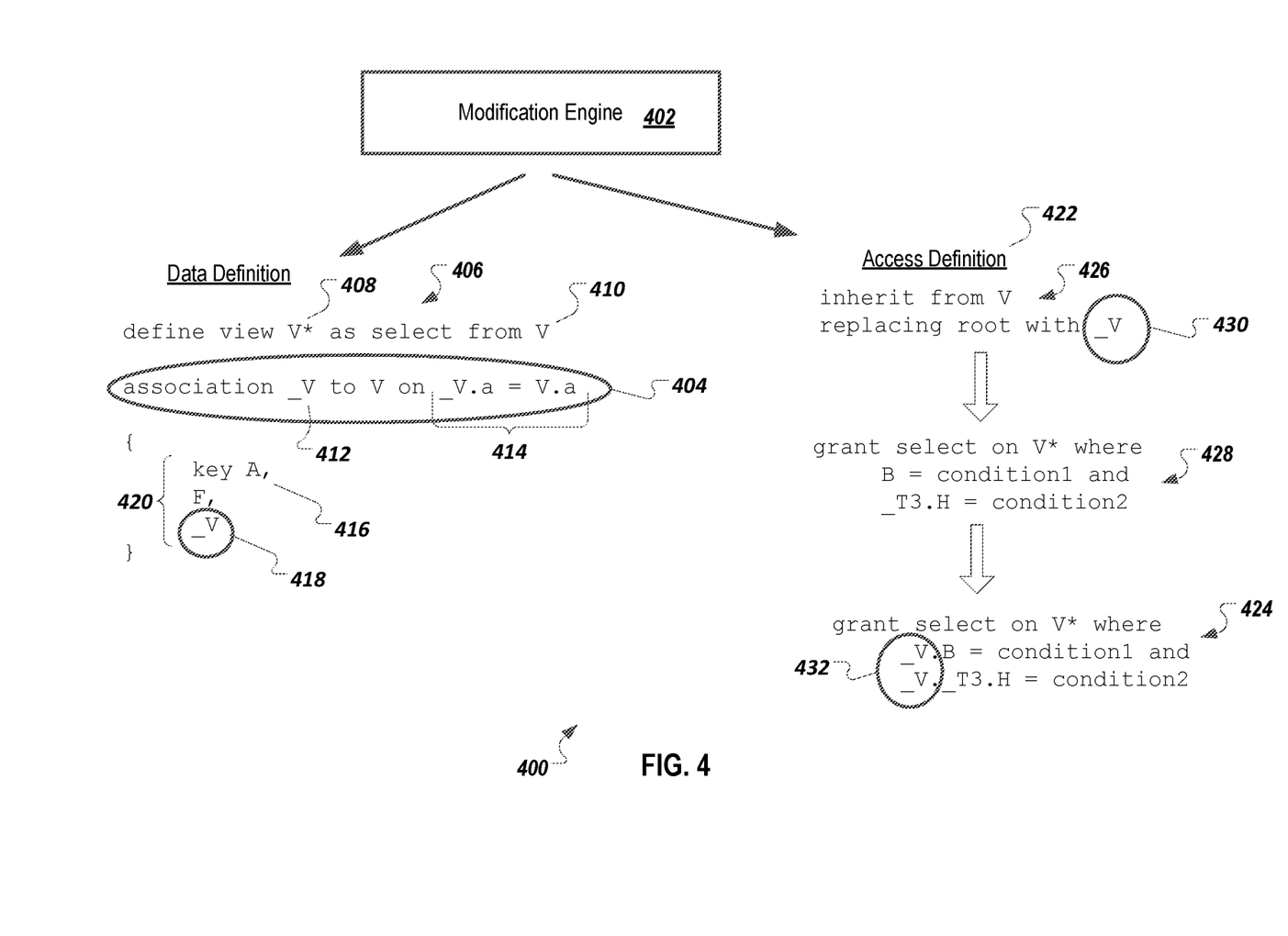
FIG. 4 illustrates an example system for association-based access control delegation.

FIG. 4 illustrates an example system 400 for association-based access control delegation. A modification engine 402 can automatically add an association statement 404 to a view definition 406 in response to the modification engine 402 determining that the view definition 406 is defining a virtual view V* 408 that is based on an existing virtual view V 410 for which access control has been defined. The association statement 404 defines an association _V 412. A join condition 414 of the association statement 404 links a key field 416 of the virtual view V* 408 to a key field of the existing virtual view V 410. The modification engine 402 automatically adds an association reference 418 for the association _V 412 to a field list 420 of the view definition 406.

The association _V 412 can be referred to as a backreference that points back to the existing virtual view V 410. The association statement 404 and the association reference can be automatically and implicitly added to the view definition 406, in an internal manner, so that the additions are not exposed externally to developers. The association _V 412 can be automatically utilized by an access control layer 422 after being added to the view definition 406.

For example, the access control layer 422 can automatically create an access definition 424 for the derived virtual view V* 408 by applying an inherit statement 426 to an existing access control definition 428 that has been defined for the existing virtual view V 410. The inherit statement 426 instructs the modification engine 402 to replace references to a "root" entity (which may be implicit) in the copy of the existing access control definition 428 with a reference 430 to the _V association 412.

Replacing implicit root references in access control conditions with an explicit reference 430 to the _V association 412 can result in field references in the access control conditions being modified to include a prefix of the reference 430 to the _V association 412, as shown by the prefixes 432 now included in the access definition 424. Adding the _V association 412 prefix results in shifting each of the field references in the access control conditions to the _V association 412 from the derived virtual view V* 408 (e.g., unqualified field references in the access control conditions would otherwise resolve to the derived virtual view V* 408, but if explicitly prefixed, now resolve to the _V association 412).

Shifting all field references in the access control conditions to the _V association 412 means that all access control conditions are syntactically correct, even if they reference fields no longer present or semantically modified in the derived virtual view V* 408, since fields included in the access control conditions will exist in the existing virtual view V 410 (e.g., since the access control conditions were originally generated to work with the existing view). The changes resulting from the inherit statement 426 can be applied automatically, without knowledge by or exposure to application developers.

Figure 5:
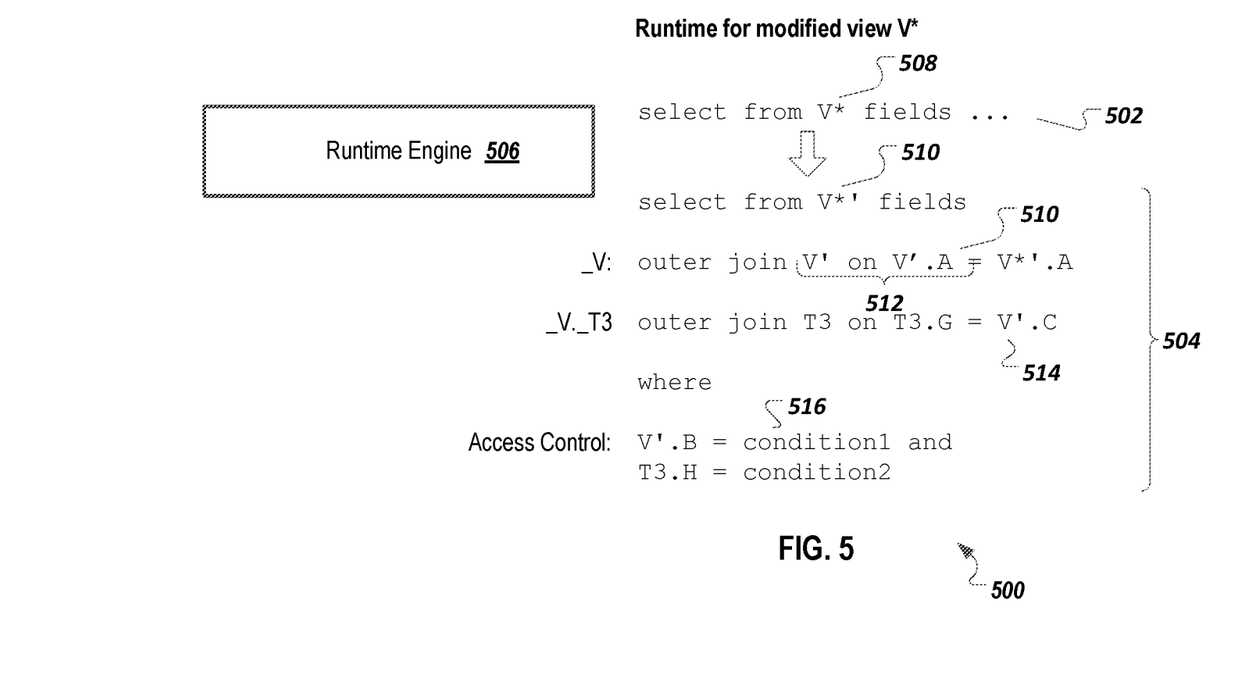
FIG. 5 illustrates an example system for runtime modification of a query to produce a modified query.

FIG. 5 illustrates an example system 500 for runtime modification of a query 502 to produce a modified query 504. The query 502 can be an application query that selects certain fields from the derived virtual view V* 408. A runtime engine 506 can replace a V* reference 508 in the query 502 with a V*' reference 510 to the V*' physical view artifact 314. The runtime engine 506 can unfold the association _V 412 by adding an outer join statement 510 to the modified query 504. The outer join statement 510 includes a join condition 512 that corresponds to the join condition 414 in the view definition 406.

The runtime engine 506 has replaced a V reference to the virtual view V 218, in the join condition 414, with a V' reference to the physical view artifact 226, now included in the join condition 512. The runtime engine 506 has replaced a _V reference in the join condition 414 with a V*' reference to the physical view artifact 314, now in the join condition 512. The runtime engine 506 has added an outer join statement 514 to the modified query 504 to handle the _T3 association 224 that is nested within the _V virtual view V 218 upon which the virtual view V* 408 is based. A where clause 516 has been added to the modified query 504 to account for the access control definition 424.

A derived entity can be used as an originating entity for another derived entity. For example, as described above, an application system can provide a default sales order entity (e.g., a default sales order view or table). A third party software provider may create and provide a first derived sales order view based on the default sales order entity, as a simplified sales order view. A particular customer may use the first derived sales order view but may desire to create a custom sales order user interface and may not need all of the fields in the first derived sales order view so may create a second derived sales order view based on the first derived sales order view.

A modification engine may perform the access control delegation approach twice, first adding, in the first derived sales order view, a first backreference to the default sales order entity, and then adding, in the second derived sales order view, a second backreference to the first derived sales order view. A runtime engine can modify received queries to add corresponding prefixes to columns that are included in access control definitions associated with the first derived sales order view or the second derived sales order view. In an intermediate query that has had prefixes added, a particular column reference could have two prefixes, one for the first derived sales order view and another for the second derived sales order view. After resolution of the prefixes, each column reference can ultimately resolve to the default sales order view.

In the examples above, derived views included a same key as the originating entity upon which the derived views were based. The access control delegation approach can work in other situations, such as when a derived entity includes some but not all of the key columns of the originating entity. The access control delegation approach can include the use of a semi join statement (rather than an outer join statement) on the subset of the originating entity key information that is included in the derived entity.

Figure 6:
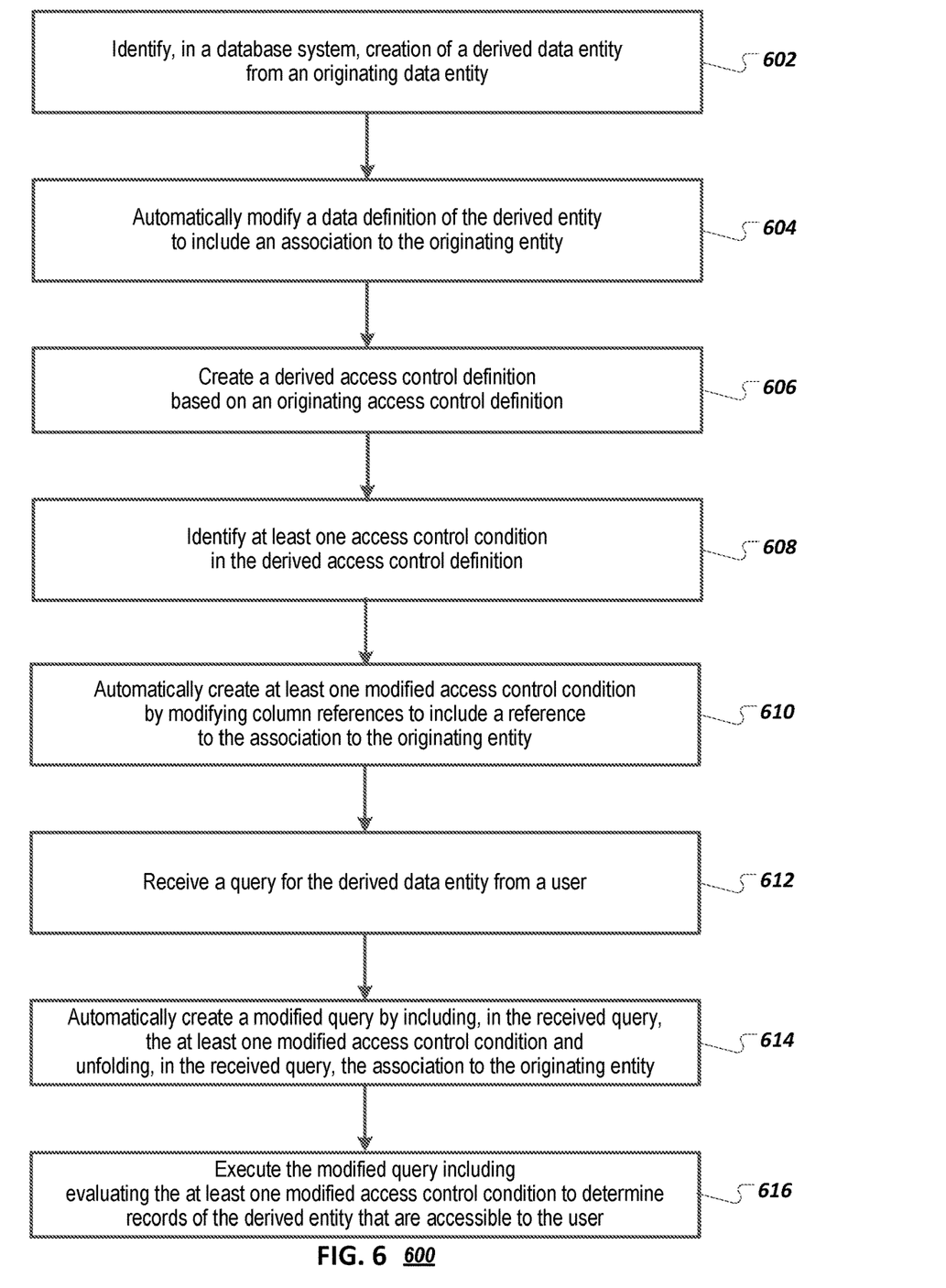
FIG. 6 is a flowchart of an example method for association-based access control delegation.

FIG. 6 is a flowchart of an example method 600 for association-based access control delegation. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the server 102 of FIG. 1.

At 602, creation of a derived data entity from an originating data entity is identified, in a database system. The originating data entity is associated with an originating access control definition. The originating entity can be a database table or a database view, for example. The derived data entity can be a database view.

For some or all derived data entities, at least one column in the originating data entity differs from columns included in the derived data entity. For some or all derived data entities, at least one column in the originating entity is not included in the derived data entity. For some or all derived data entities, at least one column in the derived data entity is a modified version of a corresponding column in the originating data entity.

At 604, a data definition of the derived entity is automatically modified to include an association to the originating entity. For example, a modification engine or a runtime engine can automatically add the association to the data definition of the derived entity. As another example, an administrator or developer can add the association.

At 606, a derived access control definition is created based on the originating access control definition. The derived access control condition can be automatically created based on the originating access control definition by applying an inherit statement, as described above. As another example, an administrator or developer can manually create at least part of the derived access control condition.

At 608, at least one access control condition is identified in the derived access control definition. Each access control condition can include at least one column reference.

At 610, at least one modified access control condition is automatically created by modifying each column reference to include a reference to the association to the originating entity. Preferably, all column references are modified to include the reference to the association, to support lifecycle changes, as described above. However, in some implementations, a determination can be made to modify some but not all column references. For example, a column associated with an access control condition that does not fit an intention of the derived entity or that is deemed unlikely to be affected by a change to an originating access control condition can be left unmodified At 612, a query for the derived data entity is received. The query is associated with a particular user.

At 614, a modified query is automatically created by including, in the received query, the at least one modified access control condition and unfolding, in the received query, the association to the originating entity.

At 616, the modified query is executed, including evaluating the at least one modified access control condition to determine records of the derived entity that are accessible to the particular user. The evaluating includes accessing data of the originating entity.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying, in a database system, creation of a derived data entity from an originating data entity, the originating data entity associated with an originating access control definition;
determining that the derived entity does not include at least one column included in the originating access control definition;
in response to determining that the derived entity does not include at least one column included in the originating access control definition:
automatically modifying a data definition of the derived data entity to include an association to the originating entity;
creating a derived access control definition based on the originating access control definition;
identifying at least one access control condition in the derived access control definition, wherein each access control condition includes at least one column reference; and
automatically modifying each column reference in the derived access control definition to include a reference to the association to the originating data entity to create at least one modified access control condition;
receiving a query for the derived data entity, the query associated with a particular user;
automatically creating a modified query by including, in the received query, the at least one modified access control condition and unfolding, in the received query, the association to the originating data entity; and
executing the modified query including evaluating the at least one modified access control condition to determine records of the derived data entity that are accessible to the particular user, wherein the evaluating includes accessing data of the originating data entity.

2. The method of claim 1, wherein the derived data entity is a database view.

3. The method of claim 1, wherein the originating data entity is a database table.

4. The method of claim 1, wherein the originating data entity is a database view.

5. The method of claim 1, wherein at least one column in the originating data entity differs from columns included in the derived data entity.

6. The method of claim 5, wherein at least one column in the derived data entity is a modified version of a corresponding column in the originating data entity.

7. The method of claim 1, wherein unfolding the association comprises including, in the received query, a join statement that links the derived data entity to the originating data entity.

8. A system comprising:
one or more computers; and
a computer-readable medium coupled to the one or more computers having instructions stored thereon which, when executed by the one or more computers, cause the one or more computers to perform operations comprising:
identifying, in a database system, creation of a derived data entity from an originating data entity, the originating data entity associated with an originating access control definition;
determining that the derived entity does not include at least one column included in the originating access control definition;
in response to determining that the derived entity does not include at least one column included in the originating access control definition:
automatically modifying a data definition of the derived data entity to include an association to the originating entity;

creating a derived access control definition based on the originating access control definition;

identifying at least one access control condition in the derived access control definition, wherein each access control condition includes at least one column reference; and automatically modifying each column reference in the derived access control definition to include a reference to the association to the originating data entity to create at least one modified access control condition;

receiving a query for the derived data entity, the query associated with a particular user;

automatically creating a modified query by including, in the received query, the at least one modified access control condition and unfolding, in the received query, the association to the originating data entity; and executing the modified query including evaluating the at least one modified access control condition to determine records of the derived data entity that are accessible to the particular user, wherein the evaluating includes accessing data of the originating data entity.

9. The system of claim 8, wherein the derived data entity is a database view.

10. The system of claim 8, wherein the originating data entity is a database table.

11. The system of claim 8, wherein the originating data entity is a database view.

12. The system of claim 8, wherein at least one column in the originating data entity differs from columns included in the derived data entity.

13. A computer program product encoded on a non-transitory storage medium, the product comprising non-transitory, computer readable instructions for causing one or more processors to perform operations comprising:

identifying, in a database system, creation of a derived data entity from an originating data entity, the originating data entity associated with an originating access control definition;

determining that the derived entity does not include at least one column included in the originating access control definition;

in response to determining that the derived entity does not include at least one column included in the originating access control definition:

automatically modifying a data definition of the derived data entity to include an association to the originating entity;

creating a derived access control definition based on the originating access control definition;

identifying at least one access control condition in the derived access control definition, wherein each access control condition includes at least one column reference; and automatically modifying each column reference in the derived access control definition to include a reference to the association to the originating data entity to create at least one modified access control condition;

receiving a query for the derived data entity, the query associated with a particular user;

automatically creating a modified query by including, in the received query, the at least one modified access control condition and unfolding, in the received query, the association to the originating data entity; and executing the modified query including evaluating the at least one modified access control condition to determine records of the derived data entity that are accessible to the particular user, wherein the evaluating includes accessing data of the originating data entity.

14. The computer program product of claim 13, wherein the derived data entity is a database view.

15. The computer program product of claim 13, wherein the originating data entity is a database table.

16. The computer program product of claim 13, wherein the originating data entity is a database view.

17. The computer program product of claim 13, wherein at least one column in the originating data entity differs from columns included in the derived data entity.

* * * * *